(12) United States Patent
Huseman et al.

(10) Patent No.: US 7,213,448 B1
(45) Date of Patent: May 8, 2007

(54) METHOD FOR ESTIMATING THE POWER CAPABILITY OF THE PRIMARY POWER SOURCE OF A HYBRID VEHICLE

(75) Inventors: Steven C. Huseman, Noblesville, IN (US); Cristina T. Ledezma, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/399,235

(22) Filed: Apr. 6, 2006

(51) Int. Cl.
*G01M 15/00* (2006.01)
(52) U.S. Cl. ....................................................... 73/116
(58) Field of Classification Search ................. 73/112, 73/115, 116, 117.2, 117.3, 118.1
See application file for complete search history.

(56) References Cited

U.S. PATENT DOCUMENTS

| | | | |
|---|---|---|---|
| 6,336,070 B1 * | 1/2002 | Lorenz et al. .............. 701/102 |
| 6,976,388 B2 | 12/2005 | Heap et al. ................. 73/118.1 |
| 2004/0210377 A1 * | 10/2004 | Cullen ......................... 701/102 |
| 2005/0252305 A1 * | 11/2005 | Hubbard et al. .............. 73/860 |
| 2005/0272556 A1 * | 12/2005 | Hiroe et al. ................... 477/3 |

* cited by examiner

*Primary Examiner*—Eric S. McCall
(74) *Attorney, Agent, or Firm*—Dan L. Thompson

(57) ABSTRACT

The present invention provides a method for estimating the power capability of the primary power source of a hybrid vehicle. The method preferably includes calculating a first indicator based on a broadcast estimate from the primary power source of a hybrid vehicle. A second indicator is obtained by calculating the difference between the value of a torque command and the amount of torque reportedly delivered in response to the torque command. A third indicator is calculated based on a plurality of system dynamic equations. The first, second and third indicators are then combined to obtain an estimate of the power capability of the primary power source.

14 Claims, 2 Drawing Sheets

US 7,213,448 B1

METHOD FOR ESTIMATING THE POWER CAPABILITY OF THE PRIMARY POWER SOURCE OF A HYBRID VEHICLE

TECHNICAL FIELD

The present invention pertains generally to a method for estimating the power capability of the primary power source of a hybrid vehicle.

BACKGROUND OF THE INVENTION

Hybrid electric vehicles typically include a primary power source such as an engine and a secondary power source such as an electric motor/generator which are operable individually or in combination to drive the vehicle. When a person driving the vehicle depresses the gas pedal, a control module establishes a driver power command. Information pertaining to the power capability of the primary power source may be valuable, for example, in selecting an appropriate response to the driver power command.

SUMMARY OF THE INVENTION

The present invention provides a method of estimating the power capability of a primary power source, such as an engine. The method includes calculating a first indicator based on a broadcast estimate from the primary power source of a hybrid vehicle. A second indicator is obtained by calculating the difference between the value of a torque command and the amount of torque reportedly delivered in response to the torque command. A third indicator is calculated based on a plurality of system dynamic equations. The first, second and third indicators are then combined to obtain an estimate of the power capability of the primary power source.

The method may also include normalizing the first, second and third indicators to a maximum system power capability.

The method may also include normalizing the first, second and third indicators to a maximum engine power capability.

Calculating the second indicator may also include monitoring the fuel consumption of the primary power source to obtain an estimate of the delivered torque.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
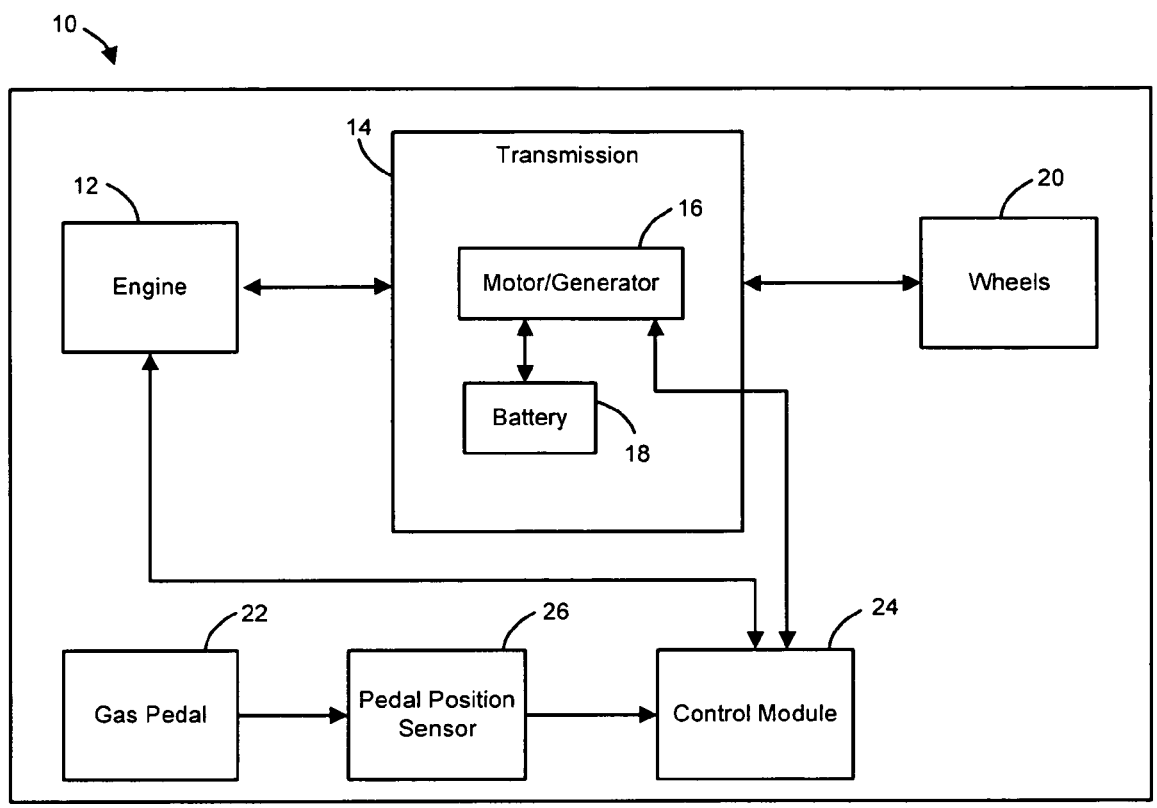
FIG. 1 is a schematic illustration of a vehicle in accordance with the present invention.

Referring to the drawings, wherein like reference numbers refer to like components, FIG. 1 shows a schematic illustration of a vehicle 10 in accordance with the present invention. The vehicle 10 includes a primary power source such as the engine 12 which is operatively connected to a transmission 14. The transmission 14 includes a secondary power source such as the motor/generator 16 which is operatively connected to an energy storage system such as the battery 18. The motor/generator 16 may draw energy from the battery 18 in order to power the vehicle 10, or may generate and transmit energy to the battery 18 for storage. The transmission 14 is connected to the wheels 20 of the vehicle 10. A gas pedal 22 is operatively connected to a control module 24 which controls the output of the engine 12 and the motor/generator 16 to power the vehicle 10. According to the preferred embodiment, the vehicle 10 is a commercial bus and the engine 12 is a diesel engine, however the present invention is also applicable to other vehicle types and engine configurations.

Figure 2:
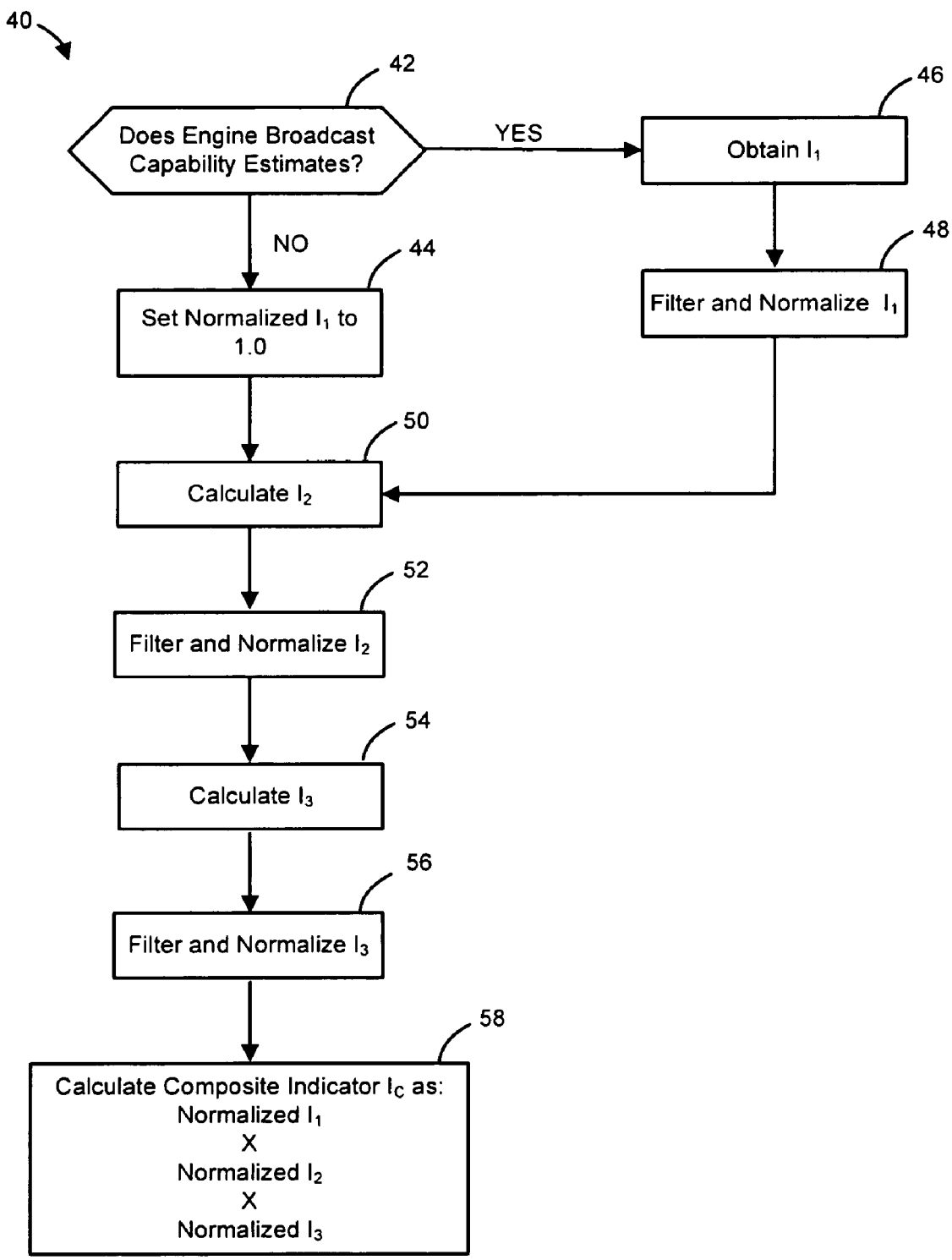
FIG. 2 is a flow chart illustrating a method in accordance with the present invention.

Referring to FIG. 2, a method 40 (also referred to herein as algorithm 40) in accordance with the present invention is shown. More precisely, FIG. 2 shows a block diagram representing steps performed by a control device such as the control module 24 (shown in FIG. 1).

As will be described in detail hereinafter, the algorithm 40 preferably calculates three indicators $I_1$, $I_2$, and $I_3$ which each provide an indication or estimate of the power capability of an engine. Thereafter, the algorithm 40 combines the indicators $I_1$, $I_2$, and $I_3$ to generate a composite indicator $I_c$. According to the preferred embodiment, the first indicator $I_1$ is based on engine broadcast data and is obtained at step 46; the second indicator $I_2$ is based on a torque request error and is calculated at step 50; and the third indicator $I_3$ is based on a plurality of system dynamic equations and is calculated at step 54.

At step 42, the algorithm 40 determines whether the engine 12 (shown in FIG. 1) is capable of broadcasting engine torque capability estimates. Engines which broadcast torque capability estimates include, for example, those using SAE J1939 data communication protocol. These estimates are preferably in the form of an engine torque capability estimate at each of several different reference engine speed values. As the broadcast data is a torque value at a given engine speed, power can be calculated according to the equation: power=(torque×engine speed)/K where K is a conversion constant (5,252 for English units). If, at step 42, the engine 12 is not capable of broadcasting engine torque capability estimates or the broadcasted values are implausible, the algorithm 40 proceeds to step 44. If, at step 42, the engine 12 is capable of broadcasting engine torque capability estimates, the algorithm 40 proceeds to step 46.

At step 44, as it has been established that the engine 12 (shown in FIG. 1) is not capable of broadcasting engine torque capability estimates, the algorithm 40 sets the normalized first indicator $I_1$ estimate to 1.0. This step has the effect of allowing for the calculation of a composite indicator $I_c$ representing the capability of an engine which does not broadcast engine torque capability estimates. In other words, by setting the normalized first indicator $I_1$ estimate to 1.0, the composite indicator $I_c$ can be calculated based exclusively on the remaining indicators $I_2$ and $I_3$ which are described in detail hereinafter.

At step 46, as it has been established that the engine 12 (shown in FIG. 1) is capable of broadcasting engine torque capability estimates, the first indicator $I_1$ based on engine broadcast data is obtained. The engine broadcast data is received by the control module 24 (shown in FIG. 1). As previously indicated, this engine broadcast data is generally in the form of an engine torque capability estimate at each of several different reference engine speed values. If the current engine speed is between two of the broadcast reference engine speeds, the control module 24 obtains a broadcast torque capability estimate corresponding to the current engine speed by interpolation.

At step 48, the algorithm 40 filters and normalizes the first indicator $I_1$. For purposes of the present invention, the term "filter" refers to the process of averaging a plurality of data points taken over a predetermined time period, and the term "normalize" refers to the process of standardizing a given indicator value to a maximum system power capability such that the normalized value is in the form of a percentage of maximum capability. Alternately, the indicator values can be normalized to a maximum engine power capability; however, normalizing to a maximum system power capability is preferable because it accounts for system losses and inefficiency. The preference may depend, for example, on the intended use of the estimated capability within the control system. The normalization data for step 48 is preferably obtained from a nominal engine torque curve stored in the control module 24 (shown in FIG. 1). Accordingly, the control module 24 obtains a nominal engine torque value for the current engine speed and compares it with the first indicator $I_1$ (obtained at step 46) to provide the normalized first indicator $I_1$.

An example illustrating the operation of steps 46 and 48 will now be provided. For purposes of this example, assume the current engine speed is 1,200 rpm. Also assume that the first indicator $I_1$ (obtained at step 46) at 1,200 rpm is 40 ft-lbs, and the nominal system torque value (obtained at step 46) at 1,200 rpm is 45 ft-lbs. According to the present example, the normalized first indicator $I_1$ is 40/45=0.889*100%=88.9%. Therefore, it is estimated that the engine is 88.9 percent capable. In other words, the engine is only capable of producing 88.9 percent of its optimal maximum torque output while running at 1,200 rpm. Since the values of torque are taken at the same engine speed, the conversion to power capability from torque capability is 1:1. It can therefore be said that the engine is 88.9% capable of its maximum power at 1,200 rpm. This value can also be calculated based on the % difference from the stored value according to the relation 1−(45−40)/45=0.889. This is the calculation method used for indicators 2 and 3 described in detail hereinafter.

At step 50, the algorithm 40 calculates the second indicator $I_2$ based on the engine power request error. The second indicator $I_2$ is calculated by subtracting a delivered torque value Td from a requested torque value Tr, and converting the resultant torque error to a power error at the current engine speed. The requested torque Tr is preferably transmitted from the control module 24 (shown in FIG. 1) to the engine 12 (shown in FIG. 1) in response to the gas pedal 22 (shown in FIG. 1) being depressed. The delivered torque Td is preferably calculated based on the fuel consumption of the engine 12 at the given operating conditions; however, the delivered torque Td may alternatively be calculated in any conventional manner.

At step 52, the algorithm 40 filters and normalizes the second indicator $I_2$ to the maximum system power capability. The normalization data for step 52 is preferably obtained from a nominal system power curve stored in the control module 24 (shown in FIG. 1). Accordingly, the control module 24 obtains a nominal system power value for the current conditions and compares it with the second indicator $I_2$ (obtained at step 52) to obtain a % error from nominal. This comparison represents a ratio of the error to the total system power capability. The normalized second indicator $I_2$ is then defined as the value of one minus the % error from nominal.

At step 54, the algorithm 40 calculates the third indicator $I_3$ based on a plurality of system dynamic equations. The plurality of system dynamic equations and a method of implementing such equations to obtain an estimate for engine torque error are described in commonly assigned U.S. Pat. No. 6,976,388, entitled "DIAGNOSTIC METHOD FOR A TORQUE CONTROL OF AN ELECTRICALLY VARIABLE TRANSMISSION", issued to Heap et al., and which is hereby incorporated by reference in its entirety. Advantageously, the third indicator $I_3$ includes an estimate of engine parasitics such as engine driven accessories in the dynamic equations as well as other errors in the reported torque possibly caused by abnormal operating conditions, thereby providing a more precise estimate of the engine power capability. This torque error is converted to a power error at the current engine speed.

The system dynamic equations of step 54 are determined using Newton's second law applicable to rotating bodies (i.e., net external torque=rotational inertia* angular acceleration). A series of free body diagrams representing components of a particular vehicle transmission are then produced. Newton's second law is applied to each component of the transmission which is represented by a free body diagram in order to obtain a summation of all the external torques acting on a given transmission component. All the free body diagrams are combined to produce one or more system matrix equations. These system matrix equations represent the characteristic open loop response of a particular vehicle system.

To obtain an estimation of the engine torque error, a closed loop control portion of the equation is added to the system matrix equations. The closed loop control portion is based on a feedback response adapted to correct for an engine speed error. The engine speed error is defined as the difference between a desired engine speed and an actual engine speed. As the magnitude of the feedback response is proportional to the engine speed error, the magnitude of the feedback response may be used to estimate the engine torque error.

At step 56, the algorithm 40 normalizes the third indicator $I_3$ to the maximum system power capability. The normalization data for step 56 is preferably obtained from a nominal system power curve stored in the control module 24 (shown in FIG. 1). Accordingly, the control module 24 obtains a nominal system power value for the current conditions and compares it with the third indicator $I_3$ (obtained at step 54) to obtain a % error from nominal. The normalized third indicator $I_3$ is then defined as the value of one minus the % error from nominal.

At step 58, the algorithm 40 calculates the composite indicator $I_c$ according to the equation: $I_c$=(normalized $I_1$*normalized $I_2$*normalized $I_3$). The resultant composite indicator $I_c$ represents an estimation of the percentage of a desired engine power value which is produceable by the engine 12. As an example, assume normalized $I_1$ is 96%, normalized $I_2$ is 90%, and normalized $I_3$ is 91%. Accordingly, $I_c$=(0.96*0.90*0.91)=0.786 or 78.6%, which means that if the nominal engine power capability at the current engine speed is 100 hp and an engine power of 100 hp is commanded, the engine will actually only produce an estimated 78.6 hp of power. From this the system can estimate that any command greater than 78.6 hp at the current engine speed will be limited to this value.

While the best mode for carrying out the invention has been described in detail, those familiar with the art to which this invention relates will recognize various alternative designs and embodiments for practicing the invention within the scope of the appended claims.

The invention claimed is:

1. A method for estimating the power capability of a primary power source of a hybrid vehicle comprising:
    calculating a first indicator including calculating the difference between the value of a torque command and the amount of torque reportedly delivered in response to the torque command;
    calculating a second indicator based on a plurality of system dynamic equations; and
    combining the first and second indicators to obtain an estimate of the power capability of the primary power source.

2. The method of claim 1, further comprising calculating a third indicator based on a broadcast capability estimate from the primary power source.

3. The method of claim 2, wherein said combining the first and second indicators includes combining the first, second and third indicators to obtain an estimate of the power capability of the primary power source.

4. The method of claim 2, further comprising normalizing the first, second and third indicators to a maximum system power capability.

5. The method of claim 4, wherein said normalizing the first, second and third indicators to a maximum system power capability includes implementing a nominal system output curve for the normalization process.

6. The method of claim 4, wherein said combining the first and second indicators includes combining the normalized first, normalized second and normalized third indicators to obtain an estimate of the power capability of the primary power source.

7. The method of claim 1, wherein said calculating a first indicator includes monitoring the fuel consumption of the primary power source to obtain an estimate of the delivered torque.

8. A method for estimating the power capability of a hybrid vehicle engine comprising:
    calculating a first indicator based on a broadcast capability estimate from the engine;
    calculating a second indicator including calculating the difference between the value of a torque command and the amount of torque reportedly delivered in response to the torque command;
    calculating a third indicator based on a plurality of system dynamic equations; and
    combining the first, second and third indicators to obtain an estimate of the power capability of the engine.

9. The method of claim 8, further comprising normalizing the first, second and third indicators to a maximum system power capability.

10. The method of claim 8, further comprising normalizing the first, second and third indicators to a maximum engine power capability.

11. The method of claim 9, wherein said combining the first and second indicators includes combining the normalized first, normalized second and normalized third indicators to obtain an estimate of the power capability of the primary power source.

12. The method of claim 11, wherein said calculating a second indicator includes monitoring the fuel consumption of the primary power source to obtain an estimate of the delivered torque.

13. A method for estimating the power capability of a hybrid vehicle engine comprising:
    calculating a first indicator based on a broadcast capability estimate from the engine;
    normalizing the first indicator to a maximum system power capability;
    calculating a second indicator including calculating the difference between the value of a torque command and the amount of torque reportedly delivered in response to the torque command;
    normalizing the second indicator to a maximum system power capability;
    calculating a third indicator based on a plurality of system dynamic equations;
    normalizing the third indicator to a maximum system power capability; and
    combining the normalized first, second and third indicators to obtain an estimate of the power capability of the engine.

14. The method of claim 13, wherein said calculating a second indicator includes monitoring the fuel consumption of the primary power source to obtain an estimate of the delivered torque.

* * * * *